United States Patent [19]

Bär et al.

[11] 4,059,352

[45] Nov. 22, 1977

[54] SLIDE PROJECTOR

[75] Inventors: Ulrich Bär, Nurnberg; Martin Schmidt, Erlangen, both of Germany

[73] Assignee: Siemens Aktiengesellschaft, Berlin & Munich, Germany

[21] Appl. No.: 683,511

[22] Filed: May 5, 1976

[30] Foreign Application Priority Data

Sept. 5, 1975   Germany .............................. 2539597

[51] Int. Cl.² .................................................. G03B 23/06
[52] U.S. Cl. ...................................... 353/103; 353/117
[58] Field of Search ............... 353/103, 114, 115, 116, 353/117, 118, 92

[56] References Cited

U.S. PATENT DOCUMENTS

| | | | |
|---|---|---|---|
| 2,949,814 | 8/1960 | Boughten et al. ..................... | 353/92 |
| 2,982,177 | 5/1961 | Briskin et al. ........................ | 353/116 |
| 3,490,839 | 1/1970 | Hipp et al. ............................ | 353/116 |
| 3,884,569 | 5/1975 | Hickey ................................... | 353/92 |

*Primary Examiner*—Steven L. Stephan
*Attorney, Agent, or Firm*—Hill, Gross, Simpson, Van Santen, Steadman, Chiara & Simpson

[57] ABSTRACT

A slide projector comprising a slide magazine with a motor drive, a motor-driven pusher for conveying respective slides one by one from the slide magazine into the path of the light of an optical system, and a guide unit for guiding the slides. A mechanical stop is provided for establishing the projection position of the slides and a spring is interposed between the pusher and its motor drive for transmitting force therebetween. For displacing the pusher there is provided a roller guided in a curved slot in a disk connected to the motor.

7 Claims, 1 Drawing Figure

U.S. Patent
Nov. 22, 1977
4,059,352
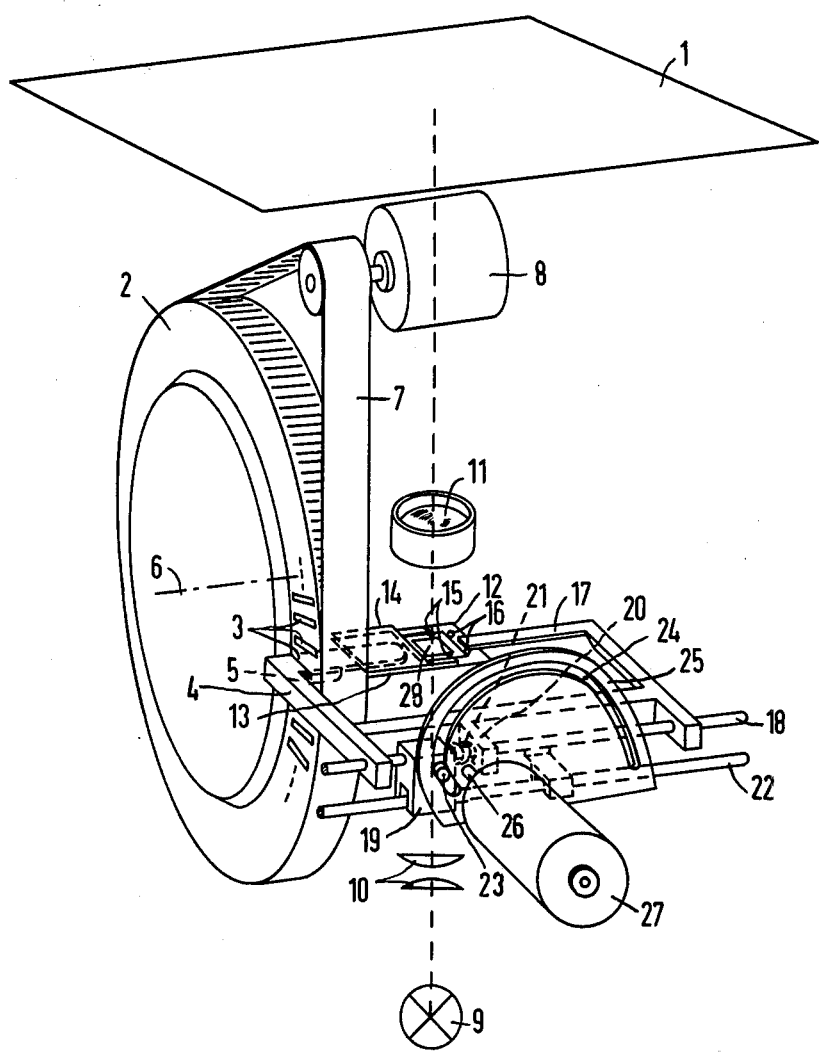

SLIDE PROJECTOR

FIELD OF THE INVENTION

The present invention relates to a slide projector comprising a motor-driven adjustable slide magazine, a motor-driven pusher for advancing each slide individually from said magazine into the path of the light beam of an optical system, and guide means for guiding the slide.

BACKGROUND OF THE INVENTION

Slide projectors are increasingly used in technical devices for reproducing pictures or images on a projection surface of the projector which is visible from the outside. For example, an apparatus is known for coding medical findings and diagnoses which comprises a frosted glass plate within an image field onto which plate medical images may be projected for the purpose of automatic recording of the findings. An arrangement for coding predetermined data is disclosed in U.S. Pat. No. 3,775,560 which is provided with a display surface for feeding defined values into a data processing unit. It is also possible with this known arrangement to provide the display surface in the form of a projection screen onto which images or pictures are projected by means of a projector, which images then facilitate the feeding into the data processing unit.

In the above-mentioned cases it is necessary to exactly fix the projection position for the film slides, so that each projected image will deviate from its correct or ideal position within only very narrow tolerances in order to allow a trouble-free input of data into the data processing system. Moreover, the operation of the projector should involve as little noise as possible, and the individual slides should be advanced rapidly from the magazine into the projecting position and returned from the latter position to the magazine.

SUMMARY OF THE INVENTION

It is an object of the present invention to provide a projector of the above-specified type which is suitable for the enumerated uses and in which the projection position of the slides is exactly fixed, so that the position of each film slide in its projecting position will vary from the ideal position within only very narrow tolerances.

According to the invention, this object is achieved by providing an arrangement with mechanical stop means for fixing the projection position of the slides, and by arranging spring means between the pusher and its motor drive for the purpose of power transmission. In the projector according to the present invention, the motor drive is coupled with said pusher not in a fixed locked arrangement but rather coupled by force by means of a spring. This type of coupling permits the use of stop means for the purpose of exactly fixing the projection position of the slide.

An exchange of slides is possible with particularly little noise by means of a roller provided for the displacement of the pusher, which roller is guided in a curved disk which is connected to an electric motor for driving said pusher, the curved disk being provided with a slot of such a form that said pusher is accelerated and halted substantially sinusoidally. In order to allow a free and unobstructed movement of the slide magazine when selecting the slides to be projected in each case, a further refinement or modification of the present invention provides for an arrangement in which the pusher comprises two tongues which are disposed in opposition to one another if the slides are conveyed in horizontal direction from and into the slide magazine, wherein the tongue ejects a slide from the magazine, and the other tongue forces the slide back into the magazine, and in which modification the curved slot is provided in such a way that the pusher, when returning a slide into the magazine, pushes said slide first completely into the magazine, and subsequently returns to a final position in which the magazine is freely movable between the two tongues.

Further advantageous details and modifications of the present invention may be derived from the following description of an embodiment explained in connection with the attached drawing.

BRIEF DESCRIPTION OF THE DRAWING

The sole FIGURE of the drawing is a perspective view of a projector according to the invention.

DETAILED DESCRIPTION

In the drawing, there is shown a projection screen 1 onto which may be projected the images of slides which are stored in a magazine 2. The magazine 2 is open on its right-hand side (as shown in the drawing) and is provided on its left-hand side (which is visible) with slots only a few of which are shown and designated by 3. Each of the slides stored in magazine 2 is provided or associated with such a slot. A pusher 4 serves for advancing or pushing a slide from magazine 2. The pusher 4 is provided with a tongue 5 which engages in a respective slot 3 disposed opposite tongue 5, thereby pushing the slide from the magazine. The magazine 2 is rotably supported around an axle 6, so that the slide whose image is to be projected may be selected by rotating magazine 2. A non-slipping toothed belt 7 serves for rotating magazine 2, said belt 7 being driven by an electromotor 8.

The projection of the image on a film slide onto projection screen 1 is achieved by means of a schematically shown optical system which comprises a light source 9 and lenses 10 and 11. The projection position of the slides in magazine 2 is determined or fixed by a jaw 12 comprising a base plate 13 and a cover plate 14. Two leaf springs 15 are secured on cover plate 14 and are pressed against base plate 13 such that they rest elastically on the edges of the slide when the slide is advanced into said jaw, thereby holding the slide against the base plate 13. The base plate 13 is provided with an aperture at the projection position which permits the passage of the light beam emitted by light source 9. Finally, two stop pins 16 are disposed on base plate 13 to engage the slide in projection position and define the projection position.

The pusher 4 is provided with a second tongue 17 which serves to return a slide from the projection position to magazine 2. The pusher 4 is supported on a bar 18 on which it is displaceable in longitudinal direction. For driving pusher 4, there is provided a transport block 19 which also is displaceable in longitudinal direction on bar 18, and which transport block is positively coupled with an attachment 20 on pusher 4 by means of a spring 21. The transport block 19 is longitudinally guided for displacement on a second bar 22, and is provided with a roller 23 which is guided in a curved slot 24 in a curved disk 25. The curved disk 25 is rigidly connected to drive shaft 26 of an electromotor 27, said shaft being eccentrically disposed with respect to said slot.

For conveying a film slide into the projection position, electromotor 27 drives its shaft 26 in rotation, and thereby rotates curved disk 25 clockwise into the position shown in the drawing. Tongue 5 now penetrates into the slot 3 disposed in each case opposite tongue 5 and thus into magazine 2, and pushes the slide to be projected into jaw 12, namely between plates 13 and 14, until said slide comes to rest with its right-hand edge against stop pins 16. The drawing shows a slide 28 in its projection position. This projection position is exactly fixed by means of said stop pins 16. The curved slot 24 is provided with such a shape that in the projection position, transport block 19 biases spring 21 against attachment 20, so that the slide is firmly resting against stop pins 16.

After the slide has been projected, motor 27 is actuated such that its shaft 26, and thereby also curved disk 25 rotates counter-clockwise. Tongue 17 now contacts the right-hand edge of slide 28 and pushes said slide back into magazine 2. Curved slot 24 is provided with such a shape that pusher 4 will be accelerated and halted substantially sinusoidally, whereby the development of noise during the exchange of slides is reduced to a minimum. The transport of the slides is thus carried out by the tongues 5 and 17 which are directed in opposition to one another. Curved slot 24 in curved disk 25 is provided with such shape that tongue 17, when returning a slide into the magazine, will first push said slide completely into the magazine, and subsequently remove itself slightly from the right-hand edge of the returned slide, i.e. tongue 17 is returned to a final position in which the magazine is freely movable between the two tongues 5 and 17. The rotation of magazine 2 by motor 8 for selecting the slide to be projected may thus take place without any interference because neither tongue 5 nor tongue 17 will slip or be in contact with the magazine during such rotation.

Motor 27 is a step motor which rotates and returns the curved disk 25 by about 180° from one position to the other.

The projector shown in the drawing is preferably to be used in association with a slide projecting apparatus in which the projection screen 1 serves the purpose of coding certain values, for example, for coding medical data. The user may in such a case feed defined data into a data storing unit as described in U.S. Pat. No. 3,775,560, namely by typing in defined ranges on projection surface 1 as they are determined in each case by the projected slide. The feeding-in of such data does not constitute the object of the present invention and may be carried out with the aid of light emitters and light receivers in accordance with said patent.

What is claimed is:

1. A slide projector comprising an optical projection system, a slide magazine being mounted for displacement, a drive motor coupled to said magazine for displacing the magazine, mechanical stop means for positioning a slide in a projection position in the projection system, guide means for guiding a slide as it is moved to the projection position, and pusher means for moving a slide from the magazine along the guide means to the projection position and for returning the slide back to said magazine, said pusher means including a pusher member being mounted for back and forth movement along a linear path, said member having two tongues extending toward one another and spaced apart to enable the magazine to move therebetween, one of the two tongues being for ejecting a slide from the magazine and the other of the two tongues being for pushing a slide back into the magazine, an electromotor, a disk having a curved slot coupled to said electromotor to move therewith, a roller being engaged in said slot, and means mounting the roller for movement in a linear path and including a spring for transferring linear displacement of the roller to the pusher member, said curved slot having a shape so that as the other tongue pushes the slide back into the magazine, it is inserted into said magazine and is then withdrawn from the magazine to a final position which enables the magazine to be freely displaced between the two spaced tongues.

2. A slide projector according to claim 1, wherein said curved slot is also configured so that the pusher member is accelerated and halted substantially sinuoidally.

3. A slide projector according to claim 1, which includes a first bar, said pusher member being supported for linear displacement along said bar, and wherein the means for mounting the roller includes a transfer block displaceable on said bar, said transfer block being coupled to said pusher member by said spring.

4. A slide projector according to claim 3, wherein said roller is mounted directly on said transfer block.

5. A slide projector according to claim 1, wherein the guide means for guiding the slide comprises a lower support plate, an upper support plate including laterally disposed springs resting on the edges of a slide as it is inserted therebetween and urging the slide against said lower support plate.

6. A slide projector according to claim 5, wherein said mechanical stop means are disposed on said lower support plate.

7. A slide projector according to claim 1, wherein said electromotor is a step motor which during each cycle of the pusher means oscillates the disk through an arc of approximately 180°.

* * * * *